(12) United States Patent
Shikata et al.

(10) Patent No.: US 11,920,549 B2
(45) Date of Patent: Mar. 5, 2024

(54) ENGINE CONTROL METHOD AND ENGINE CONTROL DEVICE

(71) Applicant: NISSAN MOTOR CO., LTD., Yokohama (JP)

(72) Inventors: Akihiro Shikata, Kanagawa (JP); Kazuki Tanzawa, Kanagawa (JP); Isei Matsuzaki, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 18/009,047

(22) PCT Filed: Jun. 12, 2020

(86) PCT No.: PCT/JP2020/023215
§ 371 (c)(1),
(2) Date: Dec. 8, 2022

(87) PCT Pub. No.: WO2021/250890
PCT Pub. Date: Dec. 16, 2021

(65) Prior Publication Data
US 2023/0272769 A1 Aug. 31, 2023

(51) Int. Cl.
*F02P 5/152* (2006.01)

(52) U.S. Cl.
CPC .............. *F02P 5/152* (2013.01); *F02P 5/1522* (2013.01)

(58) Field of Classification Search
CPC ................. F02P 5/152; F02P 5/1522
(Continued)

(56) References Cited

U.S. PATENT DOCUMENTS

| 4,426,975 | A | 1/1984 | Suzuki et al. |
| 2018/0094616 | A1 | 4/2018 | Takazawa et al. |
| 2021/0229687 | A1* | 7/2021 | Hashimoto .......... G07C 5/0808 |

FOREIGN PATENT DOCUMENTS

| CN | 105637215 A | * | 6/2016 | ........... F02D 31/001 |
| CN | 103998768 B | * | 7/2017 | .............. F02P 5/045 |

(Continued)

OTHER PUBLICATIONS

CN105637215A (Suzuki et al. ) (Jun. 1, 2016) (Machine Translation) (Year: 2016).*

(Continued)

*Primary Examiner* — Mahmoud Gimie
(74) *Attorney, Agent, or Firm* — Foley & Lardner LLP

(57) ABSTRACT

The control device (50) operates to: calculate the ignition timing of each cylinder (101) of an engine (100) based on whether or not knocking is occurring; set, as a reference ignition timing, the ignition timing of any of the cylinders (101) for which the ignition timing is on the advanced angle side relative to the most retarded angle ignition timing on the most retarded angle side and on the retarded angle side relative to the most advanced angle ignition timing on the most advanced angle side; set an allowable timing difference range that is a range of an allowable timing difference with reference to the reference ignition timing; and when determining that the ignition timing of a cylinder (101) falls outside the allowable timing difference range, correct the ignition timing so that the timing difference with respect to the reference ignition timing falls within the allowable timing difference range.

6 Claims, 4 Drawing Sheets

(58) Field of Classification Search
USPC .................................................. 123/406.23
See application file for complete search history.

(56) References Cited

FOREIGN PATENT DOCUMENTS

| | | | | | |
|---|---|---|---|---|---|
| CN | 109973279 A | * | 7/2019 | ............. | F02B 37/18 |
| EP | 2 851 541 A1 | | 3/2015 | | |
| JP | 2004100547 A | * | 4/2004 | | |
| JP | 2005076484 A | * | 3/2005 | | |
| JP | 2015-063909 A | | 4/2015 | | |
| JP | 2018-178927 A | | 11/2018 | | |

OTHER PUBLICATIONS

JP2005076484A) (Tatsuo K) (Mar. 24, 2005) (Machine Translation) (Year: 2005).*

* cited by examiner

ENGINE CONTROL METHOD AND ENGINE CONTROL DEVICE

TECHNICAL FIELD

The present invention relates to an engine control method and an engine control device.

BACKGROUND ART

In an engine having multiple cylinders, when the occurrence of knocking is detected, the ignition timing of a cylinder in which knocking is occurring is retarded to suppress the occurrence of knocking in the next combustion cycle. On the other hand, if the ignition timing of each cylinder is controlled individually, there is a risk that the variation in the ignition timing will increase and the torque difference between the cylinders will be unduly large. In the control device of Patent Document 1, therefore, the ignition timing of each cylinder is set within a range on the advanced angle side by a torque allowable ignition timing difference with reference to a most retarded angle ignition timing that is the ignition timing on the most retarded angle side.

PRIOR ART DOCUMENT

Patent Document

[Patent Document 1] JP2018-178927A

SUMMARY OF INVENTION

Problems to be Solved by Invention

In the control device of Patent Document 1, however, the most retarded angle ignition timing is used as a reference for setting the allowable range of an ignition timing difference of each cylinder; therefore, when the most retarded angle ignition timing is set on an unduly retarded angle side due to malfunction of the knock sensor or the like, the ignition timings of all the cylinders are also excessively corrected to the retarded angle side. Thus, there is a risk that the output torque of the engine will decrease.

A problem to be solved by the present invention is to provide an engine control method and an engine control device capable of suppressing a decrease in the engine output torque when control is performed to suppress the variation in the ignition timing for each cylinder.

Means for Solving Problems

The present invention solves the above problem through setting, as a reference ignition timing, the ignition timing of any of cylinders for which the ignition timing is on the advanced angle side relative to the most retarded angle ignition timing and on the retarded angle side relative to the most advanced angle ignition timing and controlling the ignition timing of each cylinder so that the timing difference with respect to the reference ignition timing falls within an allowable timing difference range.

Effect of Invention

According to the present invention, the ignition timing which serves as a reference for control is set to an ignition timing other than the most retarded angle ignition timing and other than the most advanced angle ignition timing, and the decrease in the engine output torque can therefore be suppressed when control is performed to suppress the variation in the ignition timing for each cylinder.

MODE(S) FOR CARRYING OUT THE INVENTION

Hereinafter, one or more embodiments of the present invention will be described with reference to the drawings.

Figure 1:
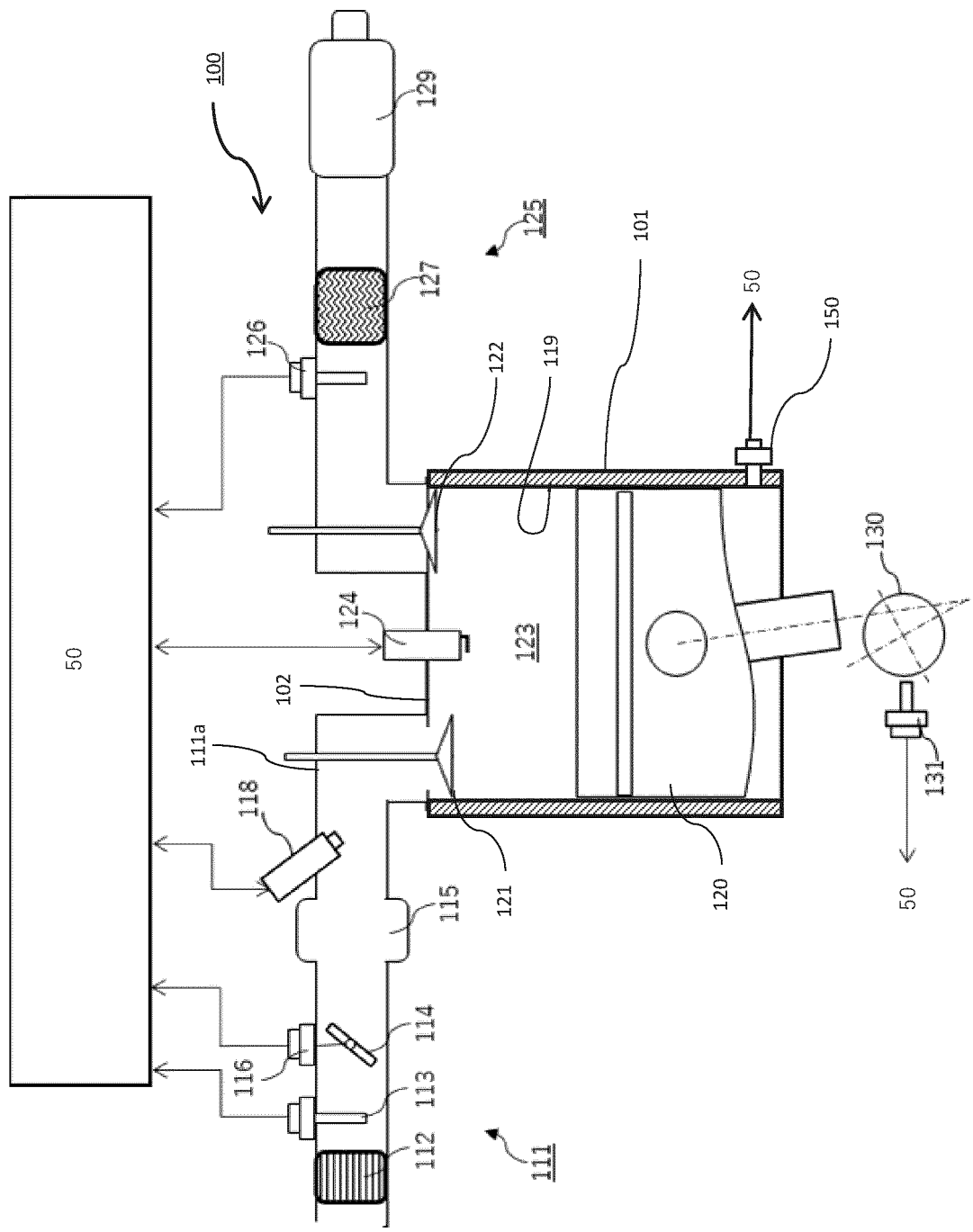
FIG. 1 is a diagram illustrating a part of the structure of an engine controlled by a control device according to an embodiment of the present invention.

As illustrated in FIG. 1, an engine (internal combustion engine) 100 is controlled by a control device 50 (ECU). The engine 100 of the present embodiment is an in-line four-cylinder engine having four cylinders, but one cylinder 101 of the cylinders is illustrated in FIG. 1. The engine 100 according to the present invention is not limited to an in-line four-cylinder engine and it suffices that the engine 100 is any engine having three or more cylinders, such as an in-line 3-cylinder engine, an in-line 6-cylinder engine, a V-type 6-cylinder engine, or a V-type 8-cylinder engine.

The engine 100 includes an intake passage 111 and an exhaust passage 125. The intake passage 111 is provided with an air filter 112, an air flow meter 113 that detects the intake air flow rate, and a throttle valve 114 and a collector 115 that control the intake air flow rate. Although not illustrated, the intake passage 111 is provided with the compressor wheel of a supercharger and an intercooler. The throttle valve 114 is provided with an actuator 116 such as a DC motor that adjusts the opening degree of the throttle valve 114. An intake passage 111a is branched from the collector 115 to each cylinder 101 and is provided with a fuel injection valve 118. The exhaust passage 125 is provided with an air-fuel ratio sensor 126, an exhaust purification catalyst 127, and a muffler 129. Although not illustrated, the exhaust passage 125 is provided with the turbine wheel of a supercharger and a bypass passage that bypasses the turbine wheel, and the bypass passage is provided with a wastegate valve for adjusting the amount of exhaust gas that bypasses the turbine wheel.

The cylinder 101 has a cylinder bore 119 formed in a cylinder block, and a piston 120 is provided in the cylinder bore 119 so as to be able to reciprocate. A cylinder head 102 is attached to the top surface of the cylinder block and is provided with an intake valve 121 and an exhaust valve 122. A space surrounded by the cylinder bore 109, the piston 120, and the cylinder head 102 constitutes a combustion chamber 123. A spark plug 124 is attached to the cylinder head 102 so as to face inside the combustion chamber 123. The cylinder block is further provided with a knock sensor 150 that detects vibration generated in the cylinder 101 to detect whether or not knocking is occurring. The knock sensor 150 is configured to include a piezoelectric element and/or a magnetostrictive material and extracts vibration of a specific frequency (knocking vibration) corresponding to knocking to convert it into an electric signal. The detection signal of the knock sensor 150 is output to the control device 50.

The engine 100 has a crankshaft 130, which is provided with a crank angle sensor 131, and the detection signal of the crank angle sensor 131 is output to the control device 50. The crank angle sensor 131 not only detects the crank angle but also serves as an engine rotation speed detection means that detects the rotation speed (the number of rotations per unit time) of the engine 100. The output signal of the crank angle sensor 131 is in response to the stroke position (such as top dead center) of the piston 120 of each cylinder 101, and the cylinder 101 in which knocking is occurring can therefore be specified from the ignition timing of the ignition plug 124 and the output signal of the crank angle sensor 131 at the timing when the knocking vibration is detected by the knock sensor 150.

The control device 50 receives the detection signal from the airflow meter 113 to acquire the intake air flow rate. The control device 50 also receives the detection signal from the air-fuel ratio sensor 126 to acquire the air-fuel ratio. The control device 50 acquires a rotation speed Ne of the engine 100 by counting crank unit angle signals of the crank angle sensor 131 for a certain period of time or by measuring the period of a crank reference angle signal.

The control device 50 outputs a control signal to the actuator 116 to electronically control the opening degrees of the throttle valve 114 and the wastegate valve so as to achieve the required torque which is calculated based on an amount of the driver's accelerator pedal operation or the like. The control device 50 also outputs a control signal to the fuel injection valve 118 to control it so that it injects the fuel, which is controlled to have a predetermined pressure, into the intake passage 111a. The control device 50 further outputs a control signal to the ignition plug 124 to ignite the intake air-fuel mixture in the combustion chamber 123.

Figure 2:
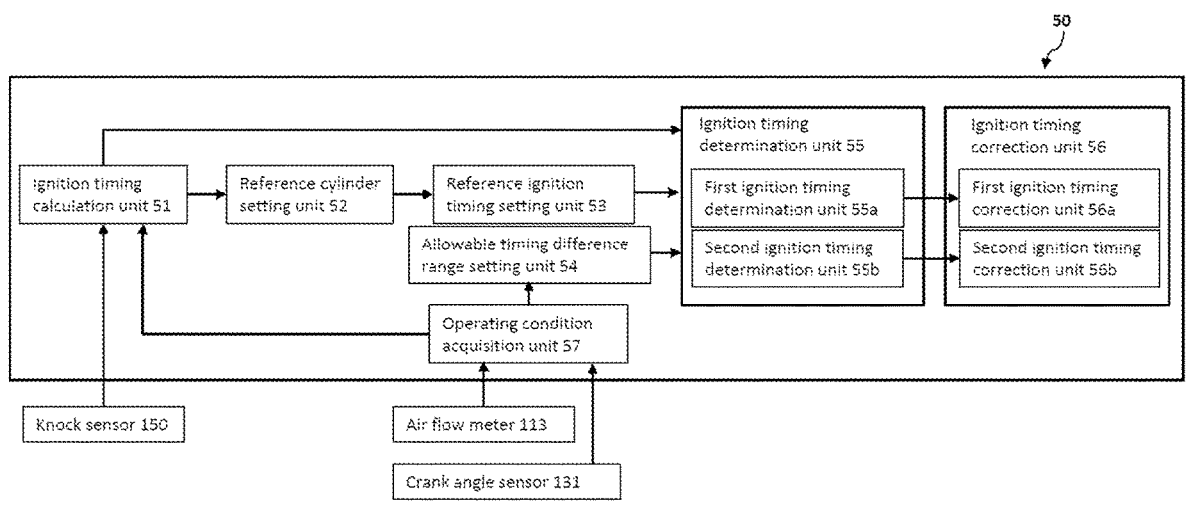
FIG. 2 is a block diagram illustrating the configuration of the control device according to an embodiment of the present invention.

The configuration of the control device 50 will then be described with reference FIG. 2.

The control device 50 has an ignition timing calculation unit 51, a reference cylinder setting unit 52, a reference ignition timing setting unit 53, an allowable timing difference range setting unit 54, an ignition timing determination unit 55, and an ignition timing correction unit 56. The control device 50 is composed of a computer having a CPU, a ROM, and a RAM. The ignition timing calculation unit 51, the reference cylinder setting unit 52, the reference ignition timing setting unit 53, the allowable timing difference range setting unit 54, the ignition timing determination unit 55, and the ignition timing correction unit 56 are stored in the ROM as programs for executing the functions of the control device 50.

The ignition timing calculation unit 51 calculates the ignition timing of each cylinder 101 based on the operating conditions of the engine 100, which are acquired by an operating condition acquisition unit 57, and whether or not knocking is occurring, which is detected by the knock sensor 150. Specifically, when the knock sensor 150 detects the occurrence of knocking, the ignition timing calculation unit 51 retards the ignition timing of the cylinder 101 in the next combustion cycle by a predetermined timing with respect to the ignition timing of the cylinder 101 which is currently set. On the other hand, when the knock sensor 150 does not detect the occurrence of knocking, the ignition timing calculation unit 51 maintains or advances, in accordance with the operating conditions of the engine 100, the ignition timing of the cylinder 101 in the next combustion cycle with respect to the ignition timing of the cylinder 101 which is currently set. The ignition timing calculation unit 51 calculates the ignition timing of the cylinder 101 in the next combustion cycle based on the current ignition timing of the cylinder 101 and the retarded or advanced angle amount for the ignition timing in the next combustion cycle. The ignition timing of a cylinder 101 is representation by a crank angle of the total retarded angle amount for the ignition timing with respect to the top dead center.

Figure 4:
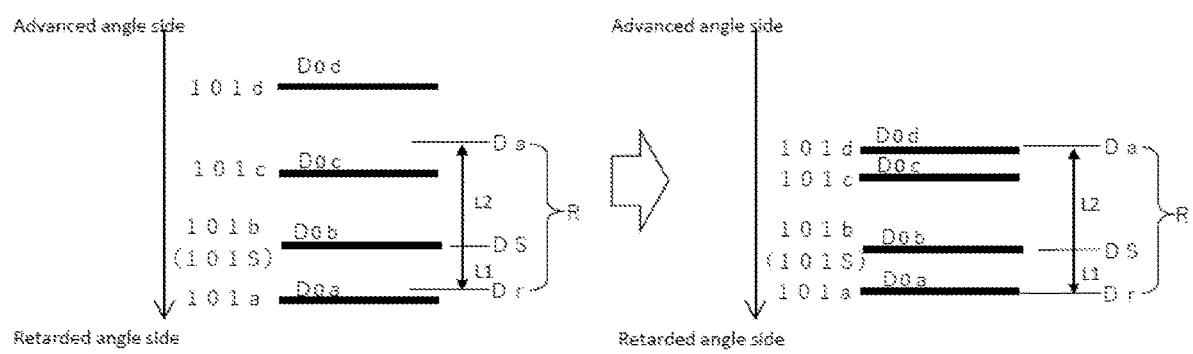
FIG. 4 is a diagram illustrating an example of correction of the ignition timings of engine cylinders by the control device of FIG. 2.

The reference cylinder setting unit 52 sets one cylinder 101 or any one of two or more cylinders 101 as a reference cylinder. The reference cylinder is a cylinder 101 for which, among the ignition timings of the four cylinders 101 at any timing, the ignition timing is set on the advanced angle side relative to an ignition timing on the most retarded angle side (referred to as a "most retarded angle ignition timing," hereinafter) and on the retarded angle side relative to an ignition timing on the most advanced angle side (referred to as a "most advanced angle ignition timing," hereinafter). In other words, the reference cylinder setting unit 52 sets, as the reference cylinder, any of the cylinders other than the cylinder with the most retarded angle ignition timing and other than the cylinder with the most advanced angle ignition timing. The reference cylinder in the present embodiment refers to a cylinder whose ignition timing is used as a reference when correcting the ignition timing. FIG. 4 is a diagram illustrating an example of correction of the ignition timings of cylinders. Specifically, as illustrated on the left side of FIG. 4, when the engine 100 has four cylinders 101a, 101b, 101c, and 101d and respective ignition timings are in order of D0a, D0b, D0c, and D0d from the advanced angle side toward the retarded angle side, the reference cylinder setting unit 52 of the present embodiment sets the cylinder 101b as a reference cylinder 101S. In the ignition timings D0a, D0b, D0c, and D0d, the ignition timing D0a is the most retarded angle ignition timing on the most retarded angle side, the ignition timing D0b is the ignition timing on the second most retarded angle side, the ignition timing D0c is the ignition timing on the third most retarded angle side, and the ignition timing D0d is the most advanced angle ignition timing on the most advanced angle side. That is, the reference cylinder setting unit 52 sets, as the reference cylinder 101S, the cylinder 101b for which the ignition timing D0b is set on the second most retarded angle side next to the most retarded angle ignition timing D0a.

The reference cylinder setting unit 52 is not limited to this and may also set, as the reference cylinder 101S, the cylinder 101c for which the ignition timing D0c is set on the third most retarded angle side with respect to the most retarded angle ignition timing D0a. Likewise, in the case of a six-cylinder engine, among the six cylinders at any timing, any of the four cylinders other than the cylinder with the most retarded angle ignition timing and other than the cylinder with the most advanced angle ignition timing is used as the reference cylinder. Likewise, in the case of an eight-cylinder engine, among the eight cylinders at any timing, any of the six cylinders other than the cylinder with the most retarded angle ignition timing and other than the cylinder with the most advanced angle ignition timing is used as the reference cylinder.

The reference ignition timing setting unit 53 sets, as a reference ignition timing DS, the ignition timing of the reference cylinder 101S obtained by the reference cylinder setting unit 52. That is, the reference ignition timing setting unit 53 sets, as the reference ignition timing DS, the ignition timing D0b of the cylinder 101b on the second most retarded angle side next to the most retarded angle ignition timing D0a.

The allowable timing difference range setting unit 54 sets, based on the operating conditions of the engine 100 acquired by the operating condition acquisition unit 57, an allowable timing difference range R that is a range of an allowable timing difference with reference to the reference ignition timing DS. Specifically, as illustrated in FIG. 4, the allowable timing difference range setting unit 54 sets a retarded angle-side allowable timing difference L1 that is a threshold on the retarded angle side of the allowable timing difference range R and sets an advanced angle-side allowable timing difference L2 that is a threshold on the advanced angle side of the allowable timing difference range R. Here, when Dr represents a crank angle retarded by the retarded angle-side allowable timing difference L1 with reference to the reference ignition timing DS while Da represents a crank angle advanced by the advanced angle-side allowable timing difference L2 with reference to the reference ignition timing DS, the allowable timing difference range R is a range that is set between the crank angle Dr and the crank angle Da.

The operating conditions of the engine 100 acquired by the operating condition acquisition unit 57 are the intake air flow rate detected by the air flow meter 113 and the rotation speed of the engine 100 detected by the crank angle sensor 131. That is, the allowable timing difference range R is set based on the rotation speed of the engine 100 and the output torque (engine load) of the engine 100 which is estimated from the intake air flow rate. The allowable timing difference range R may be set based on either the output torque (engine load) or the rotation speed of the engine 100. Additionally or alternatively, the estimation of the output torque (engine load) of the engine 100 may be calculated based on the amount of the driver's accelerator pedal operation or the like or may also be calculated based on the opening degree of the throttle valve 114. Additionally or alternatively, the operating conditions of the engine 100 acquired by the operating condition acquisition unit 57 may include the air-fuel ratio detected by the air-fuel ratio sensor 126 and the like. Then, the retarded angle-side allowable timing difference L1 and advanced angle-side allowable timing difference L2 of the allowable timing difference range R are set in accordance with such operating conditions.

In FIG. 4, the retarded angle-side allowable timing difference L1 is smaller than the advanced angle-side allowable timing difference L2, but the present invention is not limited to this, and the retarded angle-side allowable timing difference L1 and the advanced angle-side allowable timing difference L2 may be equal to each other, or the retarded angle-side allowable timing difference L1 may be larger than the advanced angle-side allowable timing difference L2.

Additionally or alternatively, the allowable timing difference range R may be a range of timing differences that is preliminarily set regardless of the operating conditions of the engine 100.

The ignition timing determination unit 55 determines whether or not the ignition timing of each cylinder 101 falls within the allowable timing difference range R with reference to the reference ignition timing DS. The ignition timing determination unit 55 has a first ignition timing determination unit 55a that determines whether or not the ignition timing on the retarded angle side relative to the reference ignition timing DS falls within the allowable timing difference range R and a second ignition timing determination unit 55b that determines whether or not the ignition timing on the advanced angle side relative to the reference ignition timing DS falls within the allowable timing difference range R.

Specifically, the first ignition timing determination unit 55a determines whether or not the ignition timing of each cylinder 101 is set on the retarded angle side relative to the retarded angle-side allowable timing difference L1 with respect to the reference ignition timing DS. For example, as illustrated on the left side of FIG. 4, the ignition timing D0a of the cylinder 101a is determined to be set on the retarded angle side relative to the retarded angle-side allowable timing difference L1 with respect to the reference ignition timing DS, that is, determined to fall outside the allowable timing difference range R.

The second ignition timing determination unit 55b determines whether or not the ignition timing of each cylinder 101 is set on the advanced angle side relative to the advanced angle-side allowable timing difference L2 with respect to the reference ignition timing DS. For example, as illustrated on the left side of FIG. 4, the ignition timing D0c of the cylinder 101c is determined to be not set on the advanced angle side relative to the advanced angle-side allowable timing difference L2 with respect to the reference ignition timing DS, that is, determined to fall within the allowable timing difference range R. On the other hand, the ignition timing D0d of the cylinder 101d is determined to be set on the advanced angle side relative to the advanced angle-side allowable timing difference L2 with respect to the reference ignition timing DS, that is, determined to fall outside the allowable timing difference range R.

The ignition timing D0b of the cylinder 101b is set at the reference ignition timing DS and is therefore determined to fall within the allowable timing difference range R.

When the ignition timing determination unit 55 determines that the ignition timing of a cylinder 101 falls outside the allowable timing difference range R, the ignition timing correction unit 56 corrects the ignition timing of the cylinder 101 so that the timing difference of the ignition timing of the cylinder 101 with respect to the reference ignition timing DS falls within the allowable timing difference range R. The ignition timing correction unit 56 has a first ignition timing correction unit 56a that corrects the ignition timing on the retarded angle side relative to the reference ignition timing DS and a second ignition timing correction unit 56b that corrects the ignition timing on the advanced angle side relative to the reference ignition timing DS.

That is, when the ignition timing of a cylinder 101 is set on the retarded angle side relative to the retarded angle-side allowable timing difference L1 with respect to the reference ignition timing DS, the first ignition timing correction unit 56a corrects the ignition timing of the cylinder 101 so that the timing difference of the ignition timing of the cylinder 101 on the retarded angle side with respect to the reference ignition timing DS becomes the retarded angle-side allowable timing difference L1. Specifically, as illustrated on the right side of FIG. 4, the ignition timing D0a of the cylinder 101a, which is set on the retarded angle side relative to the retarded angle-side allowable timing difference L1 with respect to the reference ignition timing DS, is corrected so as to coincide with the crank angle Dr which is retarded by the retarded angle-side allowable timing difference L1 with reference to the reference ignition timing DS. That is, the ignition timing D0a is corrected to the advanced angle side by D0a−D0b−L1.

Additionally or alternatively, when the ignition timing of a cylinder 101 is set on the advanced angle side relative to the advanced angle-side allowable timing difference L2 with respect to the reference ignition timing DS, the second ignition timing correction unit 56b corrects the ignition timing of the cylinder 101 so that the timing difference of the ignition timing of the cylinder 101 on the advanced angle side with respect to the reference ignition timing DS becomes the advanced angle-side allowable timing difference L2. Specifically, as illustrated on the right side of FIG. 4, the ignition timing D0$d$ of the cylinder 101$d$, which is set on the advanced angle side relative to the advanced angle-side allowable timing difference L2 with respect to the reference ignition timing DS, is corrected so as to coincide with the crank angle Da which is advanced by the advanced angle-side allowable timing difference L2 with reference to the reference ignition timing DS. That is, the ignition timing D0$d$ is corrected to the retarded angle side by D0$d$−D0$b$−L2.

In the present embodiment, the timing difference of the ignition timing D0$a$ on the retarded angle side with respect to the reference ignition timing DS is corrected so as to coincide with the retarded angle-side allowable timing difference L1, but the present invention is not limited to this, and it suffices that the timing difference of the ignition timing D0$a$ on the retarded angle side with respect to the reference ignition timing DS is not larger than the retarded angle-side allowable timing difference L1. Additionally or alternatively, the timing difference of the ignition timing D0$d$ on the advanced angle side with respect to the reference ignition timing DS is corrected so as to coincide with the advanced angle-side allowable timing difference L2, but the present invention is not limited to this, and it suffices that the timing difference of the ignition timing D0$d$ on the advanced angle side with respect to the reference ignition timing DS is not larger than the advanced angle-side allowable timing difference L2. That is, it suffices that the ignition timing of a cylinder 101 is corrected so that the timing difference of the ignition timing of the cylinder 101 with respect to the reference ignition timing DS falls within the allowable timing difference range R.

Figure 3:
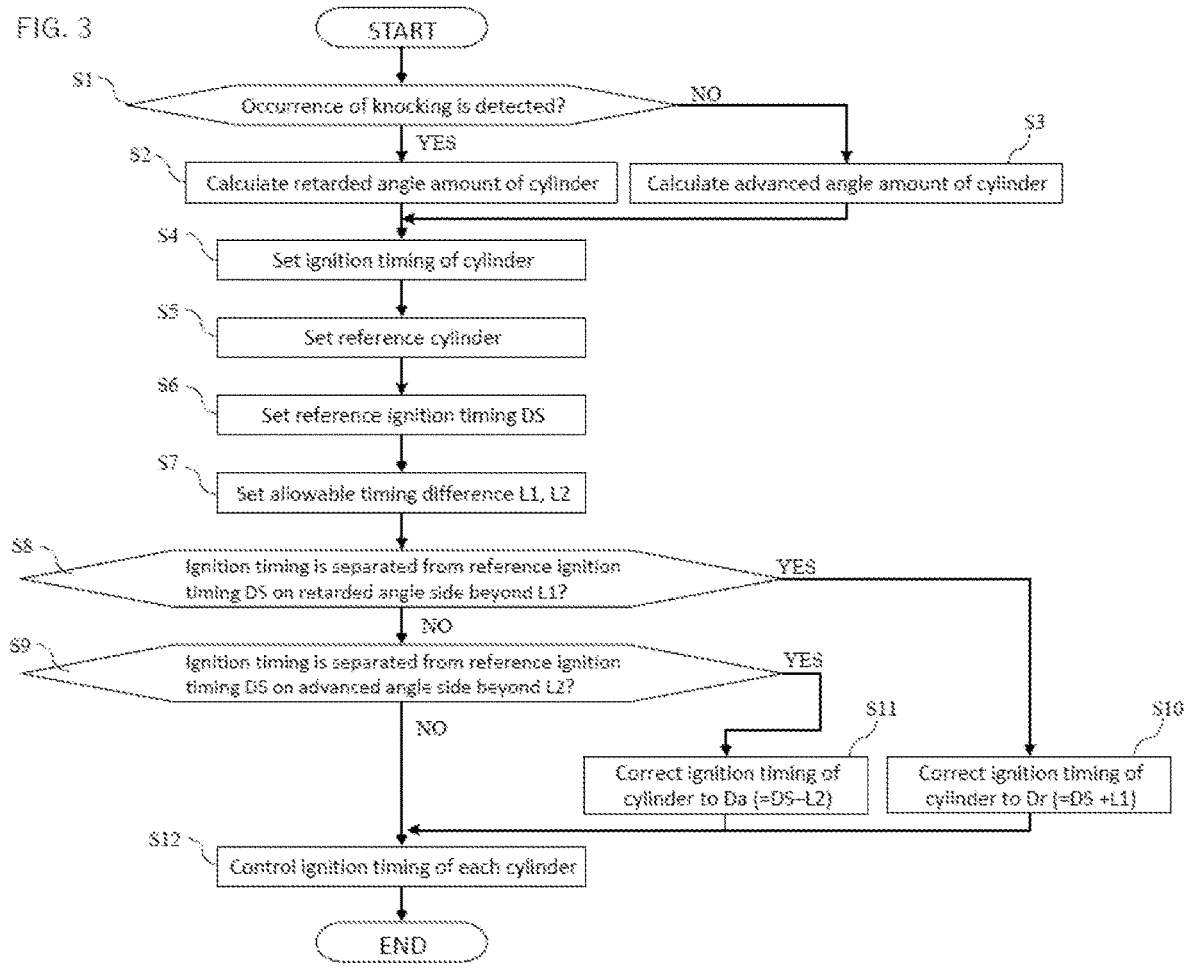
FIG. 3 is a flowchart illustrating the procedure of an engine control method executed by the control device of FIG. 2.

The procedure of a control method for the engine 100 executed by the control device 50 will then be described with reference to FIG. 3. As a premise of this control flow, it is assumed that the ignition timings of the engine 100 are set to timings in accordance with the operating conditions of the engine 100 acquired by the operating condition acquisition unit 57.

First, in step S1, the ignition timing calculation unit 51 of the control device 50 determines whether or not the knock sensor 150 detects the occurrence of knocking, and specifies a cylinder 101 in which knocking is occurring. That is, from the output signal of the crank angle sensor 131 at the timing when the knocking vibration is detected by the knock sensor 150 and the ignition timing of the spark plug 124, the cylinder 101 in which knocking is occurring is specified.

When a determination is made that the occurrence of knocking is detected, the control proceeds to step S2, in which the ignition timing calculation unit 51 calculates the retarded angle amount of the ignition timing in the next combustion cycle of the cylinder 101 in which knocking is occurring. On the other hand, when a determination is made that the occurrence of knocking is no detected, the control proceeds to step S3, in which the ignition timing calculation unit 51 calculates the advanced angle amount (including zero) of the ignition timing in the next combustion cycle of the cylinder 101 in which knocking is not occurring. Then, in step S4, the ignition timing calculation unit 51 calculates the ignition timing of each cylinder 101. Specifically, the ignition timing calculation unit 51 calculates the ignition timing of each cylinder 101 through retarding the current ignition timing of the cylinder 101, in which knocking is detected, by the retarded angle amount calculated in step S3 and maintaining or advancing the current ignition timing of the cylinder 101, in which knocking is not detected, by the advanced angle amount calculated in step S4.

Then, in step S5, the reference cylinder setting unit 52 of the control device 50 sets the reference cylinder 101S. As described above, in the present embodiment, the reference cylinder 101S is the cylinder 101$b$ for which the ignition timing D0$b$ is set on the second most retarded angle side next to the most retarded angle ignition timing D0$a$ (see FIG. 4). In step S6, the reference ignition timing setting unit 53 of the control device 50 sets the ignition timing D0$b$ of the cylinder 101$b$ as the reference ignition timing DS.

Then, in step S7, the allowable timing difference range setting unit 54 sets the retarded angle-side allowable timing difference L1 and the advanced angle-side allowable timing difference L2. As described above, the retarded angle-side allowable timing difference L1 is a threshold on the retarded angle side of the allowable timing difference range R while the advanced angle-side allowable timing difference L2 is a threshold on the advanced angle side of the allowable timing difference range R.

Then, in step S8, the first ignition timing determination unit 55$a$ determines whether or not the ignition timing of each cylinder 101 is separated from the reference ignition timing DS on the retarded angle side beyond the retarded angle-side allowable timing difference L1. That is, the first ignition timing determination unit 55$a$ determines whether or not the ignition timing of each cylinder 101 is set on the retarded angle side relative to the retarded angle-side allowable timing difference L1 with respect to the reference ignition timing DS. When a determination is made that the ignition timing of a cylinder 101 is separated from the reference ignition timing DS on the retarded angle side beyond the retarded angle-side allowable timing difference L1, the control transitions to step S10, in which the first ignition timing correction unit 56$a$ corrects the ignition timing of the cylinder 101 to Dr=DS+L1. That is, as illustrated in FIG. 4, the first ignition timing correction unit 56$a$ re-sets the ignition timing D0$a$ of the cylinder 101$a$ on the retarded angle side by the retarded angle-side allowable timing difference L1 with respect to the reference ignition timing DS. The control then transitions to step S12.

When a determination is made in step S8 that the ignition timing of a cylinder 101 is not separated from the reference ignition timing DS on the retarded angle side beyond the retarded angle-side allowable timing difference L1, the control transitions to step S9.

In step S9, the second ignition timing determination unit 55$b$ determines whether or not the ignition timing of each cylinder 101 is separated from the reference ignition timing DS on the advanced angle side beyond the advanced angle-side allowable timing difference L2. That is, the second ignition timing determination unit 55$b$ determines whether or not the ignition timing of each cylinder 101 is set on the advanced angle side relative to the advanced angle-side allowable timing difference L2 with respect to the reference ignition timing DS. When a determination is made that the ignition timing of a cylinder 101 is separated from the reference ignition timing DS on the advanced angle side beyond the advanced angle-side allowable timing difference L2, the control transitions to step S11, in which the second ignition timing correction unit 56$b$ corrects the ignition timing of the cylinder 101 to Da=DS−L2. That is, as illustrated in FIG. 4, the second ignition timing correction unit 56$b$ re-sets the ignition timing D0$d$ of the cylinder 101$d$ on the advanced angle side by the advanced angle-side allowable timing difference L2 with respect to the reference ignition timing DS. The control then transitions to step S12.

On the other hand, when a determination is made in step S9 that the ignition timing of a cylinder 101 is not separated from the reference ignition timing DS on the advanced angle side beyond the advanced angle-side allowable timing difference L2, the ignition timing correction unit 56 does not correct the ignition timing set in step S4, and the control transitions to step S12.

In step S12, the control device 50 controls the ignition timing of the spark plug 124 of each cylinder 101 based on the ignition timing which is finally set by the control of steps S1 to S11.

As described above, the control device 50 for the engine 100 according to the present embodiment sets, as the reference cylinder 101S, any of cylinders 101 for which the ignition timing is on the advanced angle side relative to the most retarded angle ignition timing on the most retarded angle side and the ignition timing is on the retarded angle side relative to the most advanced angle ignition timing on the most advanced angle side. Then, the control device 50 determines whether or not the ignition timing of each cylinder 101 falls within the allowable timing difference range R with reference to the reference ignition timing DS of the reference cylinder 101S, and when determining that the ignition timing of a cylinder 101 falls outside the allowable timing difference range R, corrects the ignition timing of the cylinder 101 so that it falls within the allowable timing difference range R. Therefore, even when the most retarded angle ignition timing is too close to the retarded angle side, such as due to erroneous detection of the occurrence of knocking by the knock sensor 150, the controller 50 does not set the most retarded angle ignition timing as the reference ignition timing and can thus prevent the ignition timings of all the cylinders 101 of the engine 100 from being set unduly on the retarded side. That is, in the control method executed by the control device 50, when performing the control for suppressing the variation in the ignition timing for each cylinder 101, it is possible to suppress a decrease in the output torque of the engine 100. Moreover, the control device 50 does not set the most advanced angle ignition timing as the reference ignition timing and can thereby set the average ignition timing of all the cylinders 101 of the engine 100 on the retarded angle side when knocking is occurring. The control device 50 can therefore prevent the occurrence of knocking while suppressing the variation in the ignition timing for each cylinder 101.

Moreover, the control device 50 sets the retarded angle-side allowable timing difference L1 that is a threshold on the retarded angle side of the allowable timing difference range R and sets the advanced angle-side allowable timing difference L2 that is a threshold on the advanced angle side of the allowable timing difference range R. The control device 50 corrects the ignition timing of a cylinder 101 so that the timing difference of the ignition timing of the cylinder 101 on the retarded angle side with respect to the reference ignition timing DS is not larger than the retarded angle-side allowable timing difference L1. Additionally or alternatively, the control device 50 corrects the ignition timing of a cylinder 101 so that the timing difference of the ignition timing of the cylinder 101 on the advanced angle side with respect to the reference ignition timing DS is not larger than the advanced angle-side allowable timing difference L2. Thus, by executing each of the control of the ignition timing on the retarded angle side and the control of the ignition timing on the advanced angle side with reference to the reference ignition timing DS, it is possible to appropriately suppress the variation in the ignition timing on the retarded angle side and the variation in the ignition timing on the advanced angle side in accordance with each condition.

Furthermore, when the ignition timing of a cylinder 101 is calculated on the retarded angle side relative to the retarded angle-side allowable timing difference L1 with respect to the reference ignition timing DS, the control device 50 corrects the ignition timing of the cylinder 101 so that the timing difference of the ignition timing on the retarded angle side with respect to the reference ignition timing DS coincides with the retarded angle-side allowable timing difference L1. This allows the ignition timing to be corrected to the maximum retarded angle side within the allowable timing difference range R for the cylinder 101 which requires prevention of the occurrence of knocking, and it is possible to prevent the occurrence of knocking.

Additionally or alternatively, when the ignition timing of a cylinder 101 is calculated on the advanced angle side relative to the advanced angle-side allowable timing difference L2 with respect to the reference ignition timing DS, the control device 50 corrects the ignition timing of the cylinder 101 so that the timing difference of the ignition timing on the advanced angle side with respect to the reference ignition timing DS coincides with the advanced angle-side allowable timing difference L2. This allows the ignition timing to be corrected to the maximum advanced angle side within the allowable timing difference range R for the cylinder 101 in which knocking is not occurring, and it is possible to suppress a decrease in the output torque of the engine 100.

Moreover, as illustrated in FIG. 4, the control device 50 sets, as the reference cylinder 101S, the cylinder 101b for which the ignition timing D0b is set on the second most retarded angle side next to the most retarded angle ignition timing D0a. This allows the control device 50 to make the average ignition timing of all the cylinders 101 close to the retarded angle side while suppressing a decrease in the output torque of the engine 100, and it is thus possible to prevent the occurrence of knocking.

Furthermore, the allowable timing difference range R is set based on at least one of the rotation speed and load (output torque) of the engine 100. This allows the control device 50 to control the ignition timing of each cylinder 101 in accordance with the operating conditions of the engine 100.

DESCRIPTION OF REFERENCE NUMERALS

50 Control device
51 Ignition timing calculation unit
53 Reference ignition timing setting unit
54 Allowable timing difference range setting unit
55 Ignition timing determination unit
56 Ignition timing correction unit
100 Engine
101 Cylinder
101S Reference cylinder
DS Reference ignition timing
R Allowable timing difference range
L1 Retarded angle-side allowable timing difference
L2 Advanced angle-side allowable timing difference

The invention claimed is:
1. An engine control method comprising:
preparing an engine having at least three cylinders;
calculating an ignition timing of each cylinder based on whether or not knocking is occurring;
setting, as a reference ignition timing, at least the ignition timing of a first cylinder of the at least three cylinders, for which the calculated ignition timing is (i) on an advanced angle side relative to a most retarded angle ignition timing on a most retarded angle side and (ii) on a retarded angle side relative to a most advanced angle ignition timing on a most advanced angle side;

setting an allowable timing difference range that is a range of an allowable timing difference with reference to the reference ignition timing;

determining whether or not the ignition timing of each cylinder falls within the allowable timing difference range;

when determining that the ignition timing of a second cylinder of the at least three cylinders falls outside the allowable timing difference range, correcting the ignition timing of the second cylinder determined to fall outside the allowable timing difference range so that the timing difference of the ignition timing of the second cylinder with respect to the reference ignition timing falls within the allowable timing difference range; and controlling an ignition timing of each cylinder of the at least three cylinders based on an operating condition.

2. The engine control method according to claim 1, wherein the setting the allowable timing difference range comprises:
- setting a retarded angle-side allowable timing difference that is a threshold on the retarded angle side of the allowable timing difference range; and
- setting an advanced angle-side allowable timing difference that is a threshold on the advanced angle side of the allowable timing difference range, the determining whether or not the ignition timing of each cylinder falls within the allowable timing difference range comprises:
- determining whether or not the ignition timing of each cylinder is set on the retarded angle side relative to the retarded angle-side allowable timing difference with respect to the reference ignition timing; and
- determining whether or not the ignition timing of each cylinder is set on the advanced angle side relative to the advanced angle-side allowable timing difference with respect to the reference ignition timing, and the engine control method comprises:
- when the ignition timing of a cylinder is set on the retarded angle side relative to the retarded angle-side allowable timing difference with respect to the reference ignition timing, correcting the ignition timing of the cylinder so that the timing difference of the ignition timing of the cylinder on the retarded angle side with respect to the reference ignition timing is not larger than the retarded angle-side allowable timing difference; and
- when the ignition timing of the cylinder is set on the advanced angle side relative to the advanced angle-side allowable timing difference with respect to the reference ignition timing, correcting the ignition timing of the cylinder so that the timing difference of the ignition timing of the cylinder on the advanced angle side with respect to the reference ignition timing is not larger than the advanced angle-side allowable timing difference.

3. The engine control method according to claim 2, comprising:
- when the ignition timing of the cylinder is set on the retarded angle side relative to the retarded angle-side allowable timing difference with respect to the reference ignition timing, correcting the ignition timing of the cylinder so that the timing difference of the ignition timing of the cylinder on the retarded angle side with respect to the reference ignition timing coincides with the retarded angle-side allowable timing difference; and
- when the ignition timing of the cylinder is set on the advanced angle side relative to the advanced angle-side allowable timing difference with respect to the reference ignition timing, correcting the ignition timing of the cylinder so that the timing difference of the ignition timing of the cylinder on the advanced angle side with respect to the reference ignition timing coincides with the advanced angle-side allowable timing difference.

4. The engine control method according to claim 1, comprising
setting, as the reference ignition timing, the ignition timing of a cylinder for which the ignition timing is set on a second most retarded angle side next to the most retarded angle ignition timing.

5. The engine control method according to claim 1, wherein the allowable timing difference range is set based on at least one of a rotation speed and a load of the engine.

6. An engine control device for controlling, based on an operating condition, an ignition timing of each cylinder of an engine having at least three cylinders, the engine control device comprising a processor configured to:
- calculate an ignition timing of each cylinder based on whether or not knocking is occurring;
- set, as a reference ignition timing, at least the ignition timing of a first cylinder of the at least three cylinders, for which the calculated ignition timing is (i) on an advanced angle side relative to a most retarded angle ignition timing on a most retarded angle side and (ii) on a retarded angle side relative to a most advanced angle ignition timing on a most advanced angle side;
- set an allowable timing difference range that is a range of an allowable timing difference with reference to the reference ignition timing;
- determine whether or not the ignition timing of each cylinder falls within the allowable timing difference range; and
- when a determination is made that the ignition timing of a second cylinder of the at least three cylinders falls outside the allowable timing difference range, correct the ignition timing of the second cylinder determined to fall outside the allowable timing difference range so that the timing difference of the ignition timing of the second cylinder with respect to the reference ignition timing falls within the allowable timing difference range.

* * * * *